United States Patent [19]

Crittenden et al.

[11] Patent Number: 5,038,603
[45] Date of Patent: Aug. 13, 1991

[54] NON-DESTRUCTIVE TESTER

[76] Inventors: Bradley J. Crittenden, 305-4373 Halifax Street, Burnaby, British Columbia, Canada, V5C 5Z4; Kenneth K. Lau, 1091 West 47th Avenue, Vancouver, British Columbia, Canada, V6M 2L3

[21] Appl. No.: 574,180

[22] Filed: Aug. 29, 1990

[51] Int. Cl.$^5$ ............................................. G01M 3/04
[52] U.S. Cl. ..................................................... 73/49.5
[58] Field of Search ................. 73/49.5, 49.6, 52, 760, 73/781, 782, 789–793, 807, 816, 825, 837, 856, 860, 822, 730

[56] References Cited

U.S. PATENT DOCUMENTS

| | | | |
|---|---|---|---|
| 3,854,328 | 12/1974 | Schmidt | 73/822 |
| 3,866,473 | 2/1975 | Teitelbaum et al. | 73/730 |
| 3,909,713 | 9/1975 | Billeter | 73/779 |
| 3,916,673 | 11/1975 | Gass et al. | 73/49.5 |
| 4,192,177 | 3/1980 | Crickard et al. | 73/49.5 |
| 4,285,230 | 8/1981 | Hartness | 73/37 |
| 4,972,719 | 11/1990 | Vinson et al. | 73/790 |

FOREIGN PATENT DOCUMENTS 0029737  3/1980  Japan ..................................... 73/837

Primary Examiner—Robert Raevis
Attorney, Agent, or Firm—C. A. Rowley

[57] ABSTRACT

A tester for testing the strength (wall stiffness) of a tubular sleeve applies axial pressure to the sleeve via a pair of sealing platens closing the open ends of the sleeve and holding the sleeve in the desired configuration. With the sleeve so held air pressure is applied to the inside of the sleeve and the deflection of at least one of the walls is measured and correlated with the applied air pressure applied thereby to obtain an indication of the strength and stiffness characteristics of the container. Generally with a rectangular cross section sleeve deflection of all four sides of the sleeve are measured.

12 Claims, 3 Drawing Sheets

NON-DESTRUCTIVE TESTER

FIELD OF THE INVENTION

The present invention relates to a tester for non-destructively testing the strength (wall stiffness) of a container. More particularly the present invention relates to a non-destructive tester for multi-walled sleeves made of corrugated paper board and specifically adapted to be used in the production of large bulk containers.

BACKGROUND OF THE PRESENT INVENTION

There are no devices available for non-destructive testing the strength characteristics of the walls of a tabular container particularly a multi-walled corrugated container to determine the effectiveness of the container to withstand interior loading other than simply to load the container to failure to determine the ultimate strength of the container in withstanding a load. Generally an axially applied load is used to find stacking strength rather than an internally applied pressure.

In many industries it is desirable to do routine testing which must be of a non-destructive nature so that the product, after testing, is still marketable. In particular it is desirable to be able to test, if possible, at least a large representative sample of the production at routine or random time intervals to ensure that quality control is being maintained.

BRIEF DESCRIPTION OF THE PRESENT INVENTION

It is an object of the present invention to provide a test method and equipment to carry out the test method for non-destructive testing of sleeves intended to form the peripheral walls of the container.

Broadly the present invention relates to a tester for testing the strength of a tubular sleeve having co-axial ends and circumferentially extending side walls comprising a first sealing platen adapted to seal one axial end of said sleeve, a second sealing platen adapted to seal the other axial end of said sleeve, means for introducing a gas (air) under pressure into said sleeve when said first and said other end are sealed by said first and second sealing platens to pressurize the interior of said sleeve and means to measure the deflection of at each of said walls.

Preferably one of said platens will be fixed to a base and the other of said platens will be moveable to axially load said sleeve, clamp said sleeve between said platens and seal said ends.

Preferably each of said means to measure deflection will include means for biasing a probe against one of said side walls and means for measuring the movement of said probe when said sleeve is pressurized.

Preferably means will be provided to retract said probe to an inoperative position to facilitate loading and unloading of a sleeve into said tester.

BRIEF DESCRIPTION OF THE PRESENT INVENTION

Further features, objects, and advantages will be evident from the following detailed description of the preferred embodiments of the present invention taken in conjunction with the accompanying drawings in which.

DESCRIPTION OF THE PREFERRED EMBODIMENTS

Figure 1:
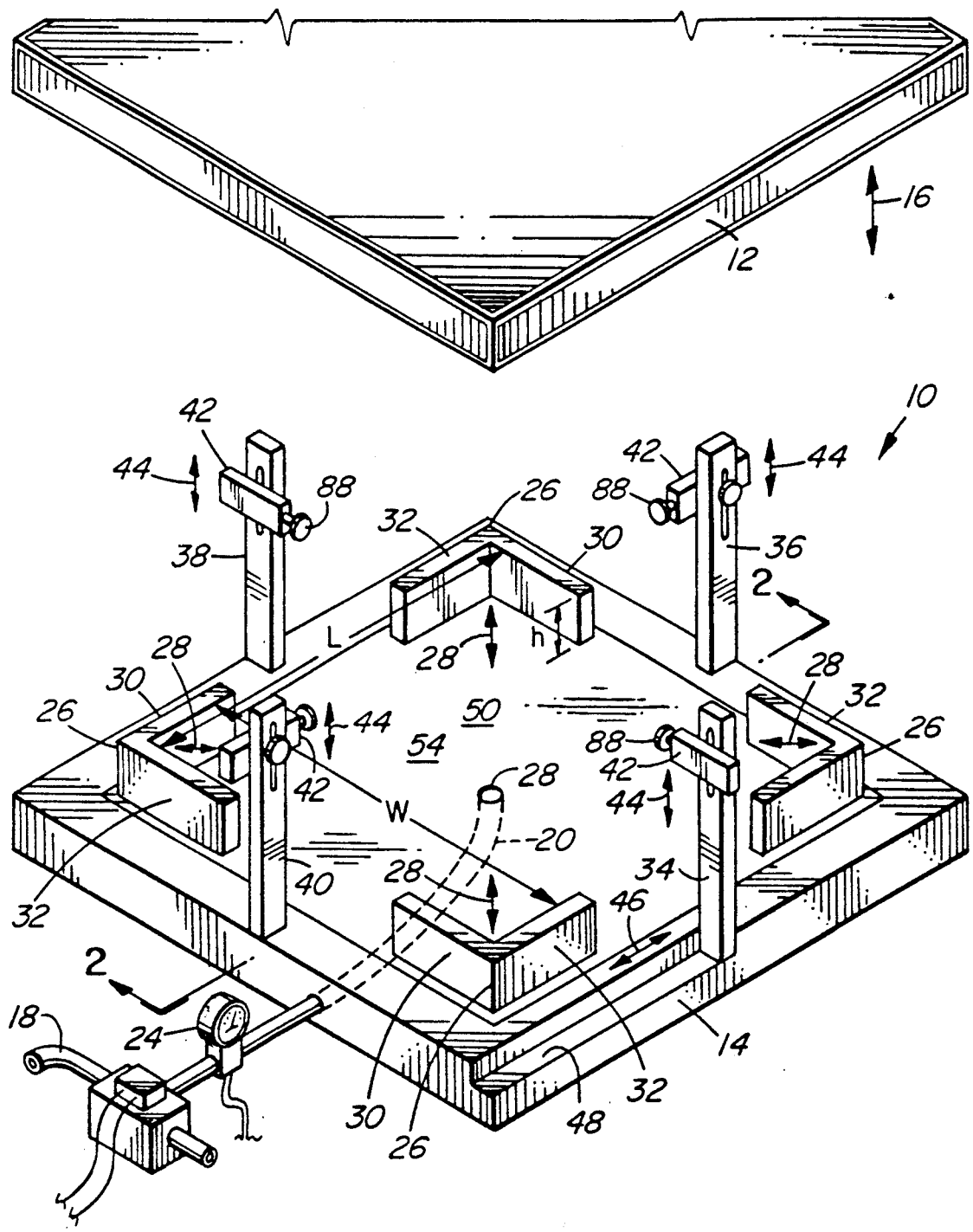
FIG. 1 is an expanded isometric view illustrating schematically the bottom and top platens separated to receive a sleeve to be tested.

As shown in FIG. 1 the tester 10 of the present invention concludes an upper platen 12 moveable toward and away from a lower platen 14 as indicated by the arrow 16. The lower platen is provided with an air inlet 18 connected to a passage 20 leading to an aperture 22 spaced from the sides of the platen 14. A gauge 24 measures and regulates the air pressure applied through inlet 22 and transmits a signal indicative of this air pressure to a computer as will be described in more detail hereinbelow.

An L-shaped squaring bracket 26 is provided at each corner of the platen 14. These L-shaped brackets or angle brackets 26 are moveable relative to the surface of the platen 14 as indicated by arrows 28. Each of the brackets 26 is formed by with a first arm 30 and a second arm 32 substantially perpendicular thereto. Alternatively an adjustable right angle bracket having each leg extending substantially the full length of the working area of the platen cooperating with a pair of moveable bars one parallel to each leg positioned to engage the opposite sides of a sleeve being tested may be used, or no squaring brackets provided.

The width of the working area of the platens 12 and 14 is defined by the spacing between opposed parallel arms, i.e. between a first pair of arms 30 and 32 of a pair of adjacent brackets 26 as indicated by the dimension W and the length as indicated by the dimension L between a second pair of parallel arms 30 and 32 substantially perpendicular to the first pairs of opposed arms 30 and 32.

The upper platen 12 may also be provided with squaring brackets (not shown) similar to those used on the bottom platen 14. The top platen 12 may also be equipped with bevelled surfaces sloping toward the centre of the platen 12 to help position the top end of the sleeve relative to the platen 12 as the platen 12 is closed onto the sleeve.

Mounted on posts 34, 36, 38 and 40 each of which extends substantially perpendicular to the surface of the pallet 14 are bulge measuring devices or deflection measuring devices 42 all of which are essentially the same and will be described in more detail hereinbelow. These posts 34, 36, 38 and 40 are located at mid-width and mid-length of the working surface of the pallet 14. Each of the bulge detectors 42 may be moved and positioned as desired vertically along their respective posts 34, 36, 38 and 40 as indicated by the arrows 44 to permit positioning at a desired height on the sleeve being tested.

The post 34 may be moved as indicated by the arrow 46 along the trough 48 to a position clear of the main pad of the working surface 50 to facilitate the positioning of a sleeve 60 (see FIG. 2) into the pad surface 50.

Figure 2:
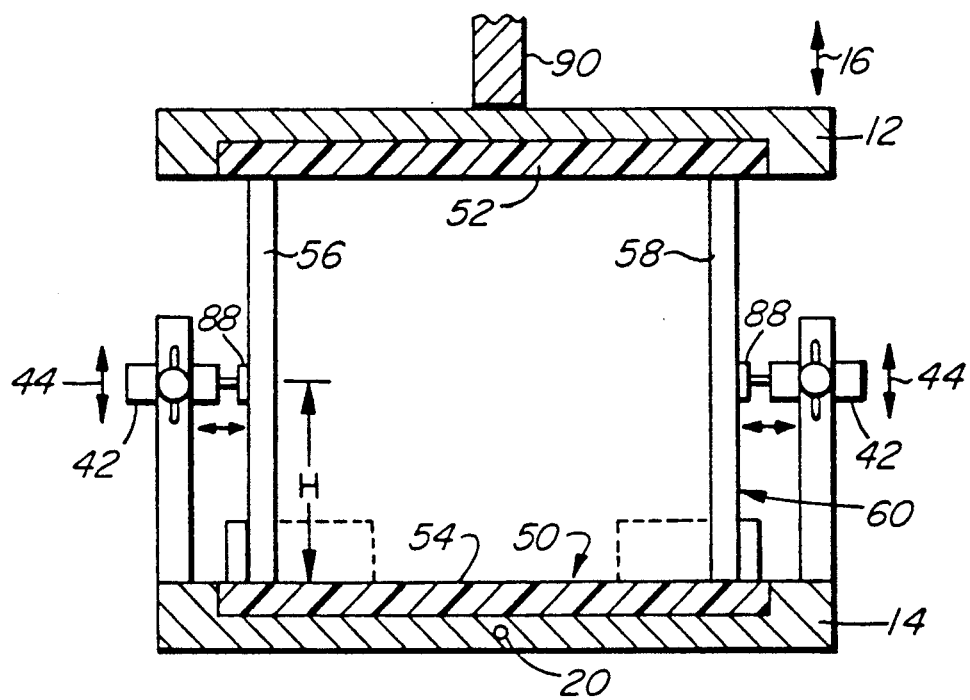
FIG. 2 is a section along the line 2—2 of FIG. 1 showing a sleeve in position and being tested.

As shown in FIG. 2 the central area or working surface 50 of both of the platens 12 and 14 are formed by a resilient insert indicated at 52 and 54 into which the side walls as indicated at 56 and 58 of the sleeve 60 being tested are forced by movement of the platen 12 relative to the platen 14 to apply axial pressure to the sleeve 60 and to clamp the sleeve 60 therebetween. The axial ends of the sleeve 60 are forced into and indent the pads at 52 and 54 around the periphery of the sleeve 60 and provide and axial end seal at each axial end of the sleeve 60.

Obviously the pads 52 and 54 need not cover the whole area as indicated by the number 50, i.e. length and width but need only be provided around the perimeter in a position to be engaged and indented by the axial ends of the sleeve 60 being tested around the full periphery of the sleeve 60 and to form a circumferential seal at each axial end of the sleeve 60 so that air pressure may be retained within the sleeve 60.

Figure 3:
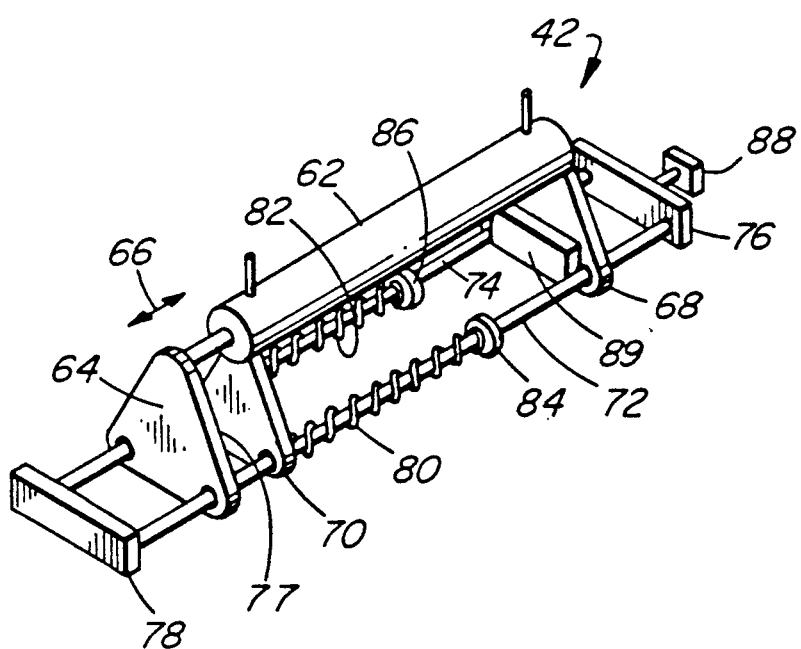
FIG. 3 is an isometric view of a deflection measuring device that may be used with the present invention.
Figure 4:
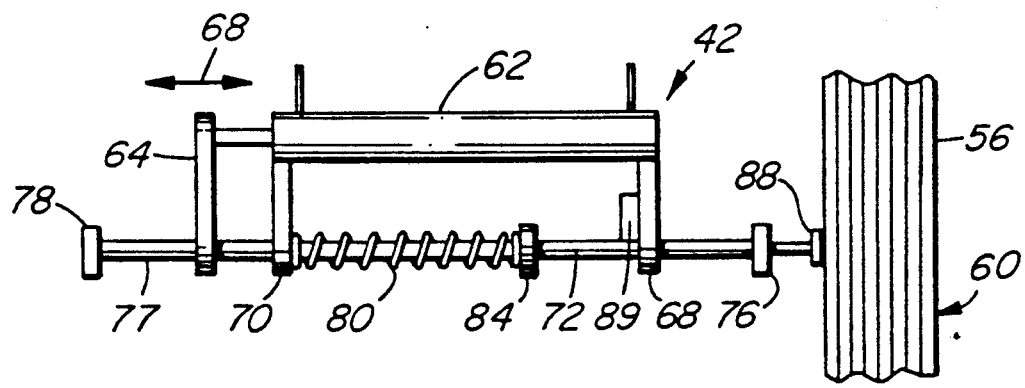
FIG. 4 is a schematic side elevation of the device of FIG. 3.

As shown in FIGS. 3 and 4 the sensors or detectors 42 preferably each comprise a retracting mechanism consisting of a double acting piston and cylinder 62 connected to a slide bar 64 and adapted to move the slide bar 64 as indicated by the arrow 66. At each end of the retracting cylinder 62 are flanges 68 and 70 through which a pair of parallel rods or shafts 72 and 74 pass. The opposite ends of these shafts are interconnected by parallel bars 76 and 78 to form a substantially rectangular structure 77 with the bars 76 and 78 forming one pair of opposed sides of the rectangle and the shaft 72 and 74 the other pair of sides. Encircling each of the rods 72 and 74 is a spring 80 or 82 respectively which are interposed between the flange 70 and boss 84 or 86 respectively fixed to the rods 72 and 74 respectively. These springs 80 and 82 bias the shaft 72 and 74 and thus the structure 77 to the right in FIGS. 3 and 4.

Mounted from the bar 76 is an engaging pad 88 that is adapted to contact a side wall such as the side wall 56 of the sleeve or carton 60.

It will be apparent that the rods 72 and 74 pass freely through holes in the flanges 68 and 70 in the element 64 and are urged to the right by the springs 80 and 82. The piston and cylinder 62 is used to move the element 64 to the left in FIGS. 3 and 4, engage the bar 78 and force the shaft 72 and 74 and the opposite bar 76 (and pad 88), i.e. structure 77, to the left by extension of the piston and cylinder 72 thereby to retract the pad 88 completely clear of the area 50. After the sleeve 60 has been positioned and is clamped between the platens 12 and 14, pistons and cylinders 62 are retracted to move the element 64 to position adjacent the flange 70 and permit the springs 80 and 82 to force the pad 88 into contact with the adjacent wall of the sleeve 60.

Figure 5:
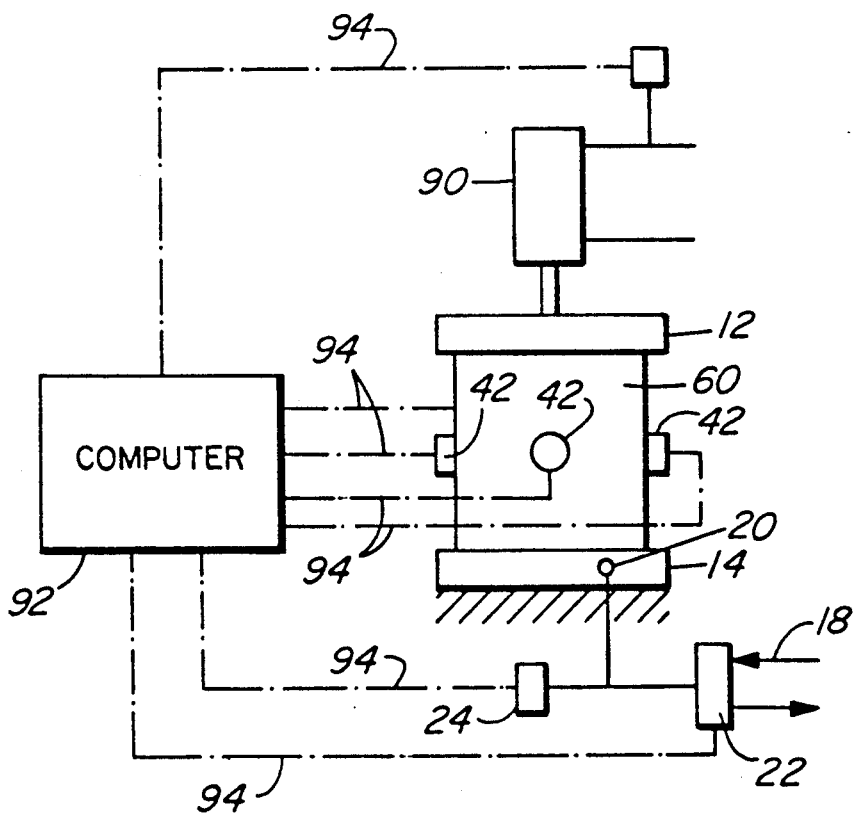
FIG. 5 is a schematic illustration of the control system and measuring arrangement of the present invention.

In operation a sleeve 60 is positioned by between the platens 12 and 14, the platen 12 is moved toward platen 14 by a piston and cylinder arrangement or any suitable means as indicated schematically at 90 under control of a suitable control system such as the computer 92 (see FIG. 5 for a schematic representation of the operation of the system).

The pressure of the platen 12 applies an axial load (which is a preselected load for the sleeve being tested) on the sleeve 60 and clamps the sleeve between the two platens 12 and 14 thereby forcing the axial ends of the sleeve 60 into the pads 52 and 54 to seal the ends of the sleeve. The sleeve is held in position by the pressure of these platens 12 and 14 and may be further supported around its bottom periphery by the flanges 30 and 32 of the angle members 26 which have been positioned as indicated by the arrow 28 to engage with the periphery or corners of the sleeve 60. The contact of these angle members 26 with the periphery of the sleeve 60 can influence the readings of the detectors 42 and thus the height h, measured in the axial direction of the sleeve 60 from the base or area 50 will be the same for each of the angle members 26 and will be selected in accordance with the average size of container (sleeve) being tested. It has been found that these supporting members 26 or their equivalent may be omitted and meaningful tests conducted.

The primary use of this testing equipment of this invention to test sleeves made of multi-walled corrugated material say ranging from 4 to 8 layers thick and having lengths and widths in the order of 3 to 5 feet (1 meter-) and an axial height of 3 to 6 feet (1 to 2 meters).

With the sleeve 60 positioned and sealed as above described the sensors 42 are set to the desired height from the surface of the pad 54. Generally this will be about $\frac{1}{2}$ of the axial length of the sleeve 60 being tested although this is not critical. All of the sensors 42 will be set to the same height H from the surface of the pad 54 (see FIG. 2).

When the set-up has been completed the piston and cylinder 62 of each of the sensors 42 (which at the time was extended for loading of the sleeve 60) is retracted to permit each of the pads 88 to move into engagement with its adjacent side walls (e.g. wall 56 or 58 of the sleeve 60). In the illustrated arrangement the set-up has been designed primarily for rectangular containers and there is one sensor 42 for each side wall of the sleeve.

The equipment is now ready to conduct tests. Each of the sensors 42, i.e. detectors 89 on the sensors 42 for detecting the movement of the shafts 72 and 74 are zeroed, the computer 92 then adjusts the valve 22 to direct air from line 18 through line 20 into the interior of the sleeve 60 to inflate the sleeve to the desired pressure for the test. This pressure, as above indicated, is regulated and measured by the sensor 24 which transmits the reading of this pressure to the computer 92 and the movements of the walls 56, 58 etc of the sleeve 60 are monitored by the sensors 42 which transmit signals as indicated by the lines 94 to the computer 92. It will be noted there are lines 94 from each of the instrumentalities to deliver signals to and from the computer 92. The axial load applied between the platens 12 and 14 is also sensed and this data supplied to the computer but if this load is the same for each test it may simply be considered as a constant.

The amount of pressure applied to the inside of the tube of sleeve 60 is relatively small per unit area but there are large areas within the sleeve so that there is a significant force generated tending to bulge the sleeve. The amount of pressure is not sufficient to cause destruction of the sleeve and if any wall of the sleeve distorts beyond a preset limit the pressure is immediately reduced.

The amount of deflection of the side walls of the sleeve 60 for a given preselected pressure within the sleeve 60 is used as an indication of the quality of the sleeve. The preset or preselected pressure is set by testing a number of boxes or sleeves to determine a reasonable value wherein substantially all the sleeves will have the significant defections but less than that when failure of the wall or walls occurs.

When the test is completed, i.e. the preselected pressure within the sleeve or a preselected deflection or a preselected time has been reached, the computer 92 operates the valve 22 to exhaust the sleeve 60 and examines the recorded defections to define the quality of the sleeve.

Preferably the pressure and deflection data are filled within a substantially straight line curve using linear least square fit and the slope of the line determined to provide the indication of wall stiffness of the sleeve or carton 60.

Having described the invention, modifications will be evident to those skilled in the art without departing from the spirit of the invention as defined in the appended claims.

We claim:

1. A tester for testing the strength of a tubular sleeve having a pair of axial ends and circumferentially extending side walls defining the periphery of said sleeve comprising a first sealing platen, a second sealing platen, means to relatively move said first and second platens and press each said platen against its adjacent of said pair of axial ends of said sleeve positioned to extend axially between said platens, sealing means on each of said platens, each said sealing means being positioned to engage and seal its respective adjacent of said pair of axial ends of said sleeve when said platens are pressed against said pair of axial ends of said sleeve, means for introducing a gas under pressure into said sleeve when said pair of axial ends are sealed by said sealing means to pressurize the interior of said sleeve and means to measure the deflection of at least one of said side walls at a preselected distance from a selected one of said axial ends while said gas pressurizes the interior of said sleeve.

2. A tester as defined in claim 1 further comprising means to measure deflection of each of said side walls.

3. A tester as defined in claim 2 wherein said second sealing platen is fixed to a base and said means to relatively move moves said first platen axially relative to said sleeve to load said sleeve, clamp said sleeve between said first and second platens and seal said opposite axial ends of said sleeve.

4. A tester as defined in claim 3 wherein each of said means to measure the deflection includes means for biasing a probe against one of said side walls and means for measuring the movement of said probe when said means for introducing a gas into said sleeve pressurizes the inside of said sleeve.

5. A tester as defined in claim 4 wherein each of said means to measure the defection further comprises means to retract said probe to an inoperative position to facilitate loading and unloading of a sleeve into said tester.

6. A tester as defined in claim 2 wherein each of said means to measure the deflection includes means for biasing a probe against one of said side walls and means for measuring the movement of said probe when said means for introducing a gas into said sleeve pressurizes the inside of said sleeve.

7. A tester as defined in claim 6 wherein each of said means to measure the defection further comprises means to retract said probe to an inoperative position to facilitate loading and unloading of a sleeve into said tester.

8. A tester as defined in claim 1 wherein said second sealing platen is fixed to a base and said means to relatively move moves said first platen axially relative to said sleeve to load said sleeve, clamp said sleeve between said first and second platens and seal said opposite axial ends of said sleeve.

9. A tester as defined in claim 8 wherein said means to measure the deflection of said at least one of said side walls includes means for biasing a probe against said at least one of said side walls and means for measuring the movement of said probe when means for introducing gas into said sleeve pressurizes the inside of said sleeve.

10. A tester as defined in claim 9 wherein said means to measure the defection further comprises means to retract said probe to an inoperative position to facilitate loading and unloading of a sleeve into said tester.

11. A tester as defined in claim 1 wherein said means to measure the deflection of at least one of said side walls includes means for biasing a probe against said at least one of said side walls and means for measuring the movement of said probe when said means for introducing a gas into said sleeve pressurizes the inside of said sleeve.

12. A tester as defined in claim 11 wherein said means to measure the defection further comprises means to retract said probe to an inoperative position to facilitate loading and unloading of a sleeve into said tester.

* * * * *